R. LARSON.
UNDERCUTTING SAW SUPPORT.
APPLICATION FILED OCT. 27, 1921.

1,424,415.

Patented Aug. 1, 1922.

Inventor
Robert Larson

By Fred G. Dieterich & Co
Attorneys

UNITED STATES PATENT OFFICE.

ROBERT LARSON, OF VANCOUVER ISLAND, BRITISH COLUMBIA, CANADA.

UNDERCUTTING-SAW SUPPORT.

1,424,415.  Specification of Letters Patent.  Patented Aug. 1, 1922.

Application filed October 27, 1921. Serial No. 510,860.

*To all whom it may concern:*

Be it known that I, ROBERT LARSON, citizen of the United States, residing at Headquarters Post Office, Vancouver Island, in the Province of British Columbia, Canada, have invented certain new and useful Improvements in Undercutting-Saw Supports, of which the following is a specification.

This invention relates to an undercutting saw support, such as is used for supporting a cross-cut saw when the same is applied to cut a log from below upward. It belongs to that class that is secured to the handle of an axe driven into the log that the resilience of the axe handle is exercised to hold the saw up to its work.

The invention is fully described in the following specification, reference being made to the drawings by which it is accompanied, in which—

Figure 1:
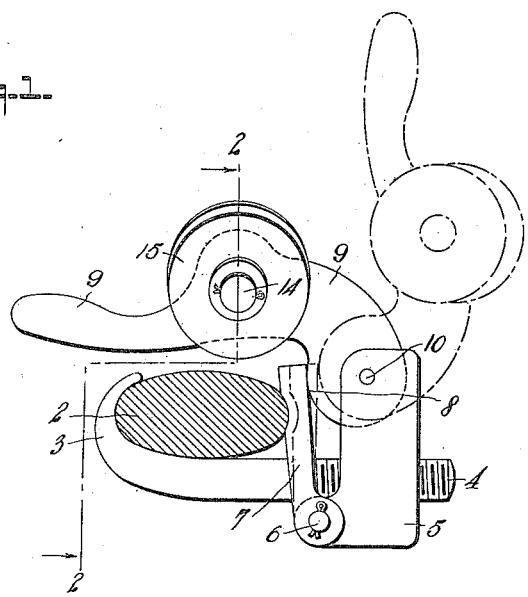
Fig. 1 is a side elevation of the device as applied to an axe handle.
Figure 2:
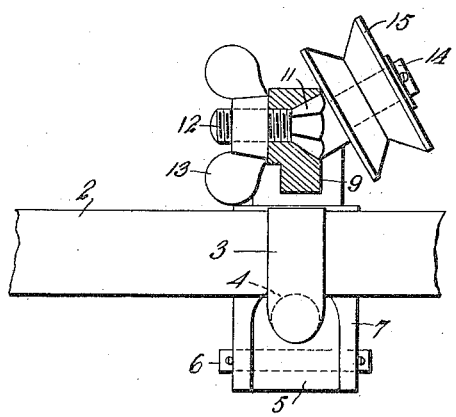
Fig. 2 is a section on the line 2—2 in Fig. 1.
Figure 3:
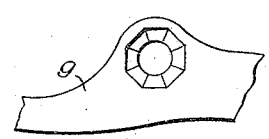
Fig. 3 is a view of the conical or pyramidal seat of the shoulder of the stud on which the small supporting sheave is mounted.

In these drawings 2 represents the handle of the axe to which the undercutting saw support is removably secured and by which handle it is resiliently supported to its work. Engaging one side of the longer axis of the handle cross section is a hook member 3, the shank 4 of which is threaded to fit into one end of a member 5 on which is pivotally mounted at 6 the opposite member 7 of the clamp to move in the plane of the hook 3.

Against the underside of the clamp member 7 bears the eccentric end 8 of a handled clamping lever 9 pivotally mounted at 10 to the member 5. This lever 9 is also movable in the plane of 5 and of the hook 3, and when the handled end is moved toward the point of the hook its eccentric end 8 clamps the member 7 on the axe handle between the end 8 and the hook 3, which, by the screw of its shank, is adjustable to the axe handle 2.

Intermediate its ends the lever member is apertured to receive the conical shoulder 11 of a stud 12, which is secured in the aperture by a wing nut 13 threaded on its outer end. The conical bearing of the stud in the aperture may be serrated or polygonal to firmly hold it against rotation.

Outside the shoulder 11 the stud is produced as at 14 with the axis of 14 at a slight angle from that of 12, which passes through the lever 9 and on this end 14 is mounted to rotate freely a small grooved sheave 15 of hard steel which is retained on the stud by a washer and pin.

In use, the axe is driven into the log with its handle extending approximately lengthwise of the log adjacent the position where it is desired to cut and the undercutting saw support is after adjustment of the handle clamped thereto by movement of the handle lever 9 upward toward the hook and the plane of rotation, and the stud is secured and clamped by the wing nut with the plane of rotation of the roller approximate the plane of movement of the cross-cut saw.

The device forms a convenient, readily applied and resiliently yielding support for the saw, when used in undercutting logs.

Having now particularly described my invention, I hereby declare that what I claim as new and desire to be protected in by Letters Patent, is:

1. A log undercutting saw support, comprising a clamp adapted for removable attachment to the handle of an axe, a lever mounted on the clamp member and by which it is secured on the axe handle, a stud secured to and projecting from the lever, and a small grooved sheave rotatably mounted on the stud.

2. A log undercutting saw support, comprising a clamp adapted for removable attachment to the handle of an axe, a lever pivotally mounted at one end to a member of the clamp by which lever the clamp is operated, a stud having a shoulder intermediate its length, the axis of the stud on one side of the shoulder being inclined to that of the other side, means for securing the shoulder of the stud against the lever in any desired position of rotational adjustment and a V grooved sheave mounted on the other end of the stud.

3. A log undercutting saw support, comprising a clamp adapted for removable attachment to the handle of an axe, a lever pivotally mounted at one end to a member of the clamp, said lever having an eccentric end by which the clamp is operated, a stud rotatably mounted in the lever to project therefrom, the axis of the projecting end being at a slight angle to that in the lever, means for securing the stud in any desired position of rotational adjustment in the lever, and a small V grooved sheave rotatably mounted on the stud.

4. A log undercutting saw support, comprising a clamp adapted to engage opposite sides of an axe handle, a lever pivotally connected to the clamp with provision whereby movement of the lever may effect the clamping, said lever having an aperture through it between its ends, a stud having a shoulder adapted to fit around the aperture of the lever the portion of the stud projecting beyond the shoulder being angularly inclined to that portion in the lever, means for securing the stud in the lever, and a grooved sheave rotatably mounted on the stud.

5. A log undercutting saw support, comprising a hook member adapted to engage one side of an axe handle the stem of which hook is threaded, a member threaded to receive the stem of the hook member, a clamp member pivotally mounted to the member in which the stem of the hook is mounted and adapted to oppose the hook member and clamp an axle handle between them, a lever pivotally mounted to the same member as the clamp the end of which lever is eccentric to its pivot to engage and move one clamp member toward the other, a stud having a shoulder intermediate its ends the axis of which stud on one side of the shoulder is inclined slightly to that on the other side and the face of the shoulder toward one end of the stud is adapted to fit a corresponding aperture in the side of the clamping lever, a nut threaded on one end of the stud and adapted to secure it in the lever, and a grooved sheave rotatably mounted on the other end of the stud.

6. A log undercutting saw support, comprising a clamp adapted for removable attachment to the handle of an axe and comprising a hook member, a nut member, a clamping lever hinged to the nut member and an eccentric lever pivoted to the nut member to engage the clamping lever for securing the clamp on an axe handle, a stud secured to and projecting from said eccentric lever, and a small grooved sheave rotatably mounted on the stud.

In testimony whereof I affix my signature.

ROBERT LARSON.